United States Patent [19]

Okinoshima et al.

[11] Patent Number: 5,376,733
[45] Date of Patent: Dec. 27, 1994

[54] PRECURSOR COMPOSITION CAPABLE OF YIELDING A POLYIMIDESILICONE RESIN

[75] Inventors: Hiroshige Okinoshima, Annaka; Hideto Kato, Takasaki; Satoshi Toyoda, Annaka, all of Japan

[73] Assignee: Shin-Etsu Chemical Co., Ltd., Tokyo, Japan

[21] Appl. No.: 216,385

[22] Filed: Mar. 23, 1994

[30] Foreign Application Priority Data

Mar. 24, 1993 [JP] Japan .................. 5-089225

[51] Int. Cl.$^5$ .............................. C08L 83/06
[52] U.S. Cl. ....................... 525/431; 528/26; 528/28; 528/41; 556/439
[58] Field of Search .............. 528/26, 28, 41; 556/439; 525/431

[56] References Cited

U.S. PATENT DOCUMENTS

| | | | |
|---|---|---|---|
| 2,823,195 | 2/1958 | Shorr et al. | 556/439 |
| 3,325,450 | 6/1967 | Holub | 260/46.5 |
| 3,847,867 | 11/1974 | Heath et al. | 260/47 CP |
| 4,795,680 | 1/1989 | Rich et al. | 428/450 |
| 4,820,781 | 4/1989 | Policastro et al. | 525/431 |
| 4,898,918 | 2/1990 | Yamamoto et al. | 525/425 |
| 4,975,490 | 12/1990 | Okawa et al. | 525/431 |

FOREIGN PATENT DOCUMENTS 64-85220 3/1989 Japan .
2168065A 6/1986 United Kingdom .

Primary Examiner—Ralph H. Dean
Assistant Examiner—Margaret W. Glass
Attorney, Agent, or Firm—Lowe, Price, LeBlanc & Becker

[57] ABSTRACT

A polyimidesilicone resin precursor composition which comprises a polysiloxane of the following general formula

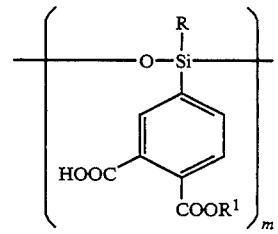

wherein R is a monovalent organic group having up to 10 carbon atoms, $R^1$ represents a hydrogen atom or a monovalent organic group having up to 10 carbon atoms, and m is an integer not smaller than 3, and a polyamic acid or a polyimide obtained from the polyamic acid. The composition is cured at a relatively low temperature within a short time to provide a cured film having improved solvent and heat resistances and good adhesion to various substrates.

10 Claims, No Drawings

PRECURSOR COMPOSITION CAPABLE OF YIELDING A POLYIMIDESILICONE RESIN

BACKGROUND OF THE INVENTION

1. Field of the Invention

This invention relates to a precursor composition capable of forming a film of a polyimidesilicone resin at low temperatures within a short time.

2. Description of the Prior Art

As is known in the art, polyimide resins have wide utility in the fields of electronic industries since they have good heat resistance, mechanical strength and pattern forming properties and can be obtained as having a very high purity.

In general, however, polyimide resins are disadvantageous in poor adhesion to substrates such as silicon wafers. In order to improve the adhesion, attempts have been made to introduce siloxane bonds into a polyimide structure. For instance, U.S. Pat. Nos. 3,325,450 and 3,847,867 set forth processes for producing polyimides by reaction between diaminosiloxane used as a diamine component and a tetracarboxylic acid. Alternatively, Japanese Laid-open Patent Application No. 64-85220 and British Patent No. 2,168,065 set out processes for producing polyimides by reaction between a tetracarboxylic dianhydride having a siloxane bond and used as a tetracarboxylic acid component and a diamine component.

However, known polyimide resins having polysiloxane bonds in the backbone thereof are disadvantageously lower in heat resistance and mechanical characteristics than polysiloxane bond-free polyimides. If poly(siloxane-acid anhydride) wherein a number of dicarboxylic anhydride units are bonded to polysiloxane units is reacted with diamines in solutions to obtain polyimides, gelation is very likely to take place, making it difficult to obtain a polyimide with a uniform composition. Such a polyimide is not suited for surface protection such as of electronic parts.

Polyimide resins are insoluble in general-purpose organic solvents except for some high boiling solvents. In order to obtain a film of polyimide resin, it is usual to dissolve a polyamic acid, which is the precursor of a polyimide resin, in organic solvents and apply the resultant solution onto a substrate. The thus applied substrate is subjected to heat treatment at high temperatures over a prolonged time to remove the solvent and to cause ring-closure through dehydration thereby forming and curing a polyimide resin. However, the heat treatment under high temperature and prolonged time conditions is not advantageous from the standpoint of the production process. If the imidization does not proceed satisfactorily, the resultant cured film is impeded in physical properties. Accordingly, there is a demand for polyimide resins which are capable of being dissolved in solvents and being cured by heat treatment at low temperatures within a short time. However, when polyimides of the types which are soluble in organic solvents are dissolved in solvents, applied and cured, the resultant polyimide resin film is generally poor in solvent resistance.

SUMMARY OF THE INVENTION

It is accordingly an object of the invention to provide a precursor composition which is capable of forming a polyimidesilicone resin by heating under mild conditions, e.g. at low temperatures within a short time.

It is another object of the invention to provide a precursor composition capable of yielding a polyimidesilicone resin which has not only good adhesion to substrates such as silicon wafers, but also good heat and solvent resistances and mechanical characteristics, thus such a resin being very useful for surface protection of various types of electronic parts.

It is a further object of the invention to provide a cured polyimidesilicone resin product obtained from the composition.

The above objects can be achieved, according to the invention, by a precursor composition capable of yielding a polyimidesilicone resin which comprises:

(A) a polysiloxane comprising units of the following general formula (1)

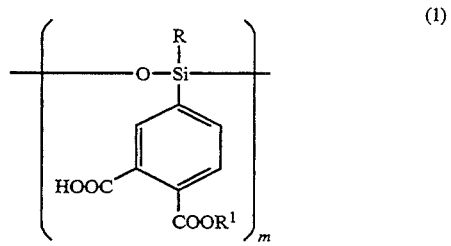

wherein R represents a monovalent organic group having up to 10 carbon atoms, $R^1$ represents a hydrogen atom or a monovalent organic group having up to 10 carbon atoms, and m is an integer not smaller than 3; and (B) a polyamic acid of the following general formula (2), or a polyimide resin derived from the polyamic acid

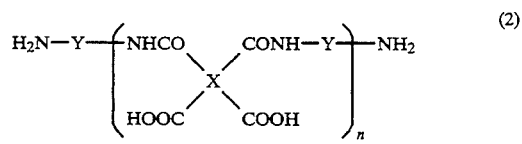

wherein X represents a tetravalent organic group and Y represents a divalent organic group, n is an integer or 1 or over, a ratio by weight between the polyamic acid or polyimide resin derived from the polyamic acid and the polysiloxane being in the range of 1:1 to 100:1.

The precursor composition of the invention is usually dissolved in solvents at appropriate concentrations. When the composition using the polyamic acid is thermally treated, the solvent is evaporated and the polyamic acid (B) is dehydrated and ring closed into a polyimide resin. The terminal amino groups of the polyimide and the dicarboxylic acid groups of the polysiloxane (A) are reacted with each other, thereby causing condensation and ring closure reactions to form a polyimidesilicone resin. If a polyimide resin which is obtained by heat treatment of the polyamic acid of the general formula (2) is used as the ingredient (B), heating of the precursor composition results immediately in formation of the polyimidesilicone resin.

DETAILED DESCRIPTION OF THE INVENTION

The respective ingredients used in the precursor composition of the invention are described in detail.

Ingredient (A)

The polysiloxane (A) should have siloxane units of the afore-indicated general formula (1). In the general formula (1), R represents a monovalent organic group having up to 10 carbon atoms. Examples of the group include an alkyl group such as a methyl group, an ethyl group, a propyl group and the like, and an aryl group such as a phenyl group. Of these, a methyl group and an ethyl group are preferred. $R^1$ represents a hydrogen atom or a monovalent organic group up to 10 carbon atoms. Examples of the organic group include an alkyl group such as a methyl group, an ethyl group, a propyl group and the like, and an aryl group such as a phenyl group. Of these, a methyl group, an ethyl group and a propyl group are preferred. m is an integer of not smaller than 3, preferably 3 to 12.

The polysiloxane is obtained, for example, by subjecting 4-(dichloroalkylsilyl)phthalic anhydride to hydrolysis according to the following reaction formula (3) to obtain a dicarboxylic anhydride

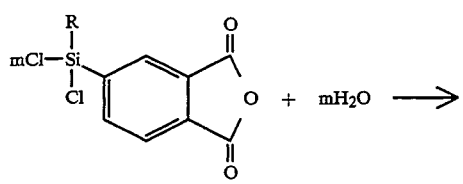
(3)

Subsequently, the dicarboxylic anhydride is hydrolyzed to obtain the polysiloxane according to the following reaction formula (4)

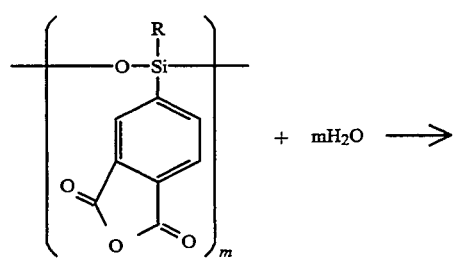
(4)

-continued

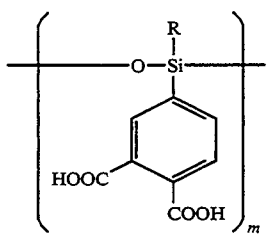

The thus obtained polysiloxane is of the general formula (1) wherein $R^1$ is a hydrogen atom (i.e. a carboxylic acid). The polysiloxanes of the formula (1) where $R^1$ is such a monovalent organic group as set out before (i.e. an ester), can be obtained by heating the dicarboxylic anhydride of polysiloxane obtained by the reaction formula (3) along with an alcohol according to the following reaction formula (5)

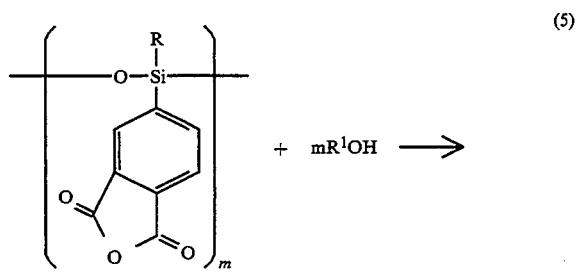
(5)

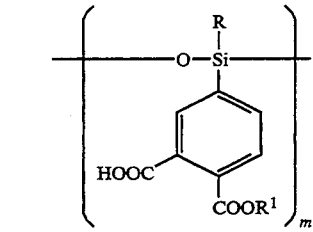

In the practice of the invention, so far as the polysiloxane (A) has a predetermined amount of the units of the general formula (1) and generally not less than 5 wt % of the units, copolymers with other organopolysiloxanes may be used. Such copolymers may be obtained by subjecting combinations with other chlorosilanes such as dialkylchlorosilanes to co-hydrolysis in the afore-indicated hydrolysis reaction (3).

Preferably, the polysiloxane is a cyclic siloxane compound having the units of the formula (1) wherein m is an integer of 3 to 12.

Ingredient (B)
Polyamic acid

The polyamic acid used as the ingredient (B) is a polyimide forming ingredient which reacts with the organopolysiloxane of the ingredient (A) having dicarboxylic acid groups or carboxylate groups. The polyamic acid is represented by the afore-indicated general formula (2) and can be obtained by reaction between a tetracarboxylic dianhydride and an excess of a diamine in an inert solvent according to the following reaction formula (6)

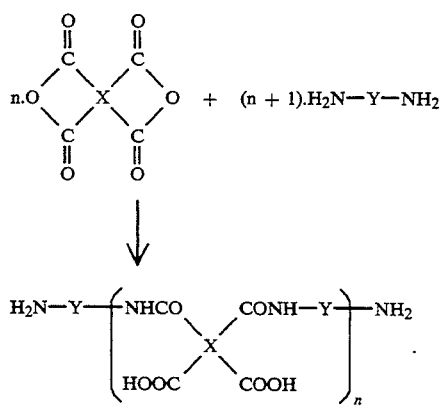

(6)

The tetravalent organic group represented by X in the formula (2) is derived from the tetracarboxylic dianhydride used in the reaction formula (6). Although not limited to those compounds, examples of the tetracarboxylic dianhydrides usable in the above formula include 3,3', 4,4'-biphenyltetracarboxylic dianhydride, 2,2'-bis(3,4-benzenedicarboxylic acid anhydrido)-perfluoropropane, bis(3,4-dicarboxyphenyl)dimethylsilane anhydride, 1,3-bis(3,4-dicarboxyphenyl)- 1,1,3,3-tetramethyldisiloxane anhydride, 2,2-bis[4-(3,4-dicarboxyphenoxy)phenyl]propane, and bis(3,4-dicarboxyphenyl)sulfone. These tetracarboxylic dianhydride may be used singly or in combination.

The divalent organic group represented by Y in the formula (2) is derived from the diamine. Examples of the diamines include, singly or in combination, p-phenylenediamine, m-phenylenediamine, 4,4'-diaminodiphenylmethane, 4,4'-diaminodiphenyl ether, 2,2'-bis(4-aminophenyl)propane, 4,4'-diaminodiphenylsulfone, 4,4'-diaminodiphenylsulfide, 1,4-bis(3-aminophenoxy)benzene, 1,4-bis(4-aminophenoxy)benzene, 1,4-bis(m-aminophenylsulfonyl)benzene, 1,4-bis(p-aminophenylsulfonyl)benzene, 1,4-bis(m-aminophenylthioether)benzene, 1,4-bis(p-aminophenylthioether)benzene, 2,2-bis[4-(4-aminophenoxy)phenyl]propane, 2,2-bis[3-methyl-4-(4-aminophenoxy)phenyl]propane, 2,2-bis[3-chloro-4-(4aminophenoxy)phenyl]propane, 1,1-bis[4-(4-aminophenoxy)phenyl]ethane, 1,1-bis[3-methyl-4-(4-aminophenoxy)phenyl]ethane, 1,1-bis[3-chloro-4-(4aminophenoxy)phenyl]ethane, 1,1-bis[3,5-dimethyl-4-(4-aminophenoxy)phenyl]ethane, bis[4-(4-aminophenoxy)phenyl]methane, bis[3-methyl-4-(aminophenoxy) phenyl]methane, bis[3-chloro-4-(4-aminophenoxy)phenyl]methane, bis[3,5-dimethyl-4-(4-aminophenoxy)phenyl]methane, bis[4-(4-aminophenoxy)-phenyl]sulfone, 2,2-bis [4-(4-aminophenoxy)phenyl]perfluoropropane, and silicone diamines of the following formulas

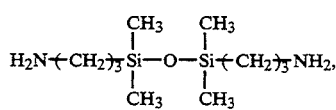

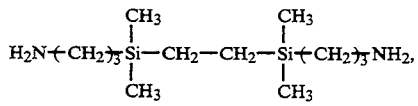

-continued

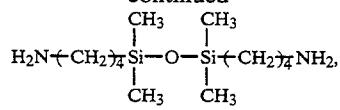

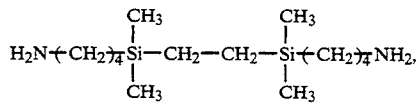

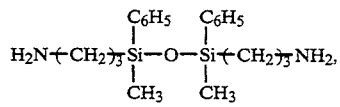

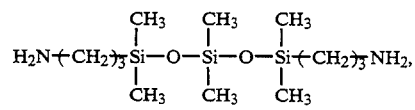

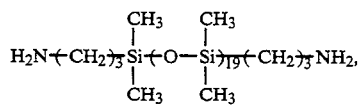

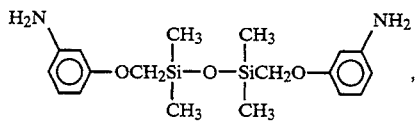

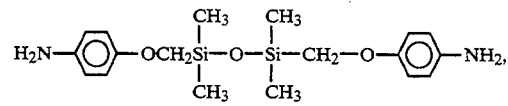

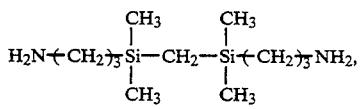

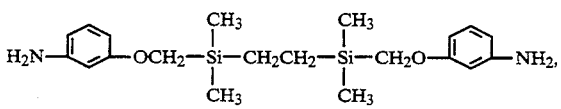

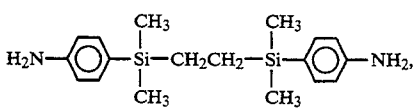

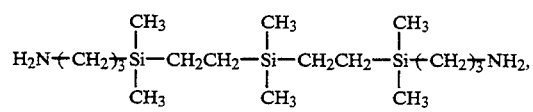

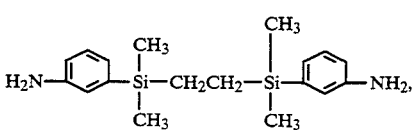

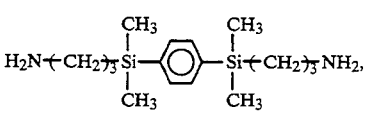

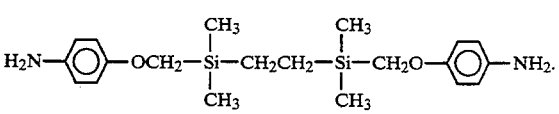

The inert solvents used for the reaction between the tetracarboxylic dianhydride and the diamine may be any solvents which do not adversely influence the reaction. Preferably, there are used solvents which are able to dissolve therein polyamic acid reaction products and polyimide resins obtained by thermal treatment of the polyamic acid product. Such solvents include, for example, tetrahydrofuran, 1,4-dioxane, diethylene glycol dimethyl ether, methyl cellosolve (ethylene glycol monomethyl ether), ethyl cellosolve (ethylene glycol monoethyl ether), butyl cellosolve (ethylene glycol monobutyl ether), acetone, methyl ethyl ketone, methyl isobutyl ketone, cyclopentanone, cyclohexanone, γ-butyrolactone, butyl cellosolve acetate (ethylene glycol monobutyl ether acetate), butyl acetate, ethyl acetate, N-methyl-2-pyrrolidone, N,N-dimethylacetamide, N,N-dimethylformamide and the like. These may be used singly or in combination.

The reaction between the tetracarboxylic dianhydride and the diamine represented according to the formula (6) may proceed by any known procedures. For instance, the diamine is used in excess relative to the tetracarboxylic dianhydride. Preferably, the tetracarboxylic dianhydride and the diamine are used at a molar ratio of 0.5:1 to 0.99:1. The starting compounds are dissolved in the above-indicated solvent to an extent as large as possible and mixed under agitation in an inert atmosphere at temperatures not higher than 80° C., preferably in the vicinity of room temperature or below. By this, the polymerization reaction quickly proceeds, so that the reaction solution gradually increases in viscosity, thereby producing an intended polyamic acid.

Polyimide Resins

In the practice of the invention, the polyimide resin obtained by thermal treatment of the polyamic acid may be used as the ingredient (B) in place of the polyamic acid. More particularly, the polyamic acid is heated to a temperature of 100° to 200° C., thereby causing ring closure through dehydration of the polyamic acid according to the following reaction formula (7)

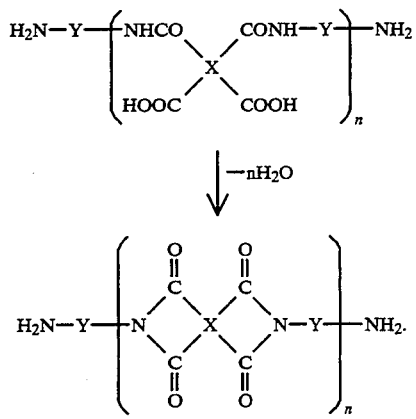

In order to facilitate the dehydration, it is preferred to use azeotropic dehydrators such as toluene, xylene and the like.

Precursor Composition

The precursor composition for polyimidesilicone resin is obtained by mixing a solution of the polyamic acid or polyimide resin with polysiloxane (A). In general, the polyamic acid or polyimide resin is mixed with the polysiloxane at a ratio by weight of 1:1 to 100:1, preferably 3:1 to 50:1. Most preferably, these ingredients (A) and (B) are so mixed that the ratio between the amine equivalent of the terminal amino groups of the polyamic acid or polyimide resin and the carboxy equivalent of the polysiloxane is in the range of 1:1.8 to 1:2.2. The amount of the solvent in the composition is so controlled that the composition has an appropriate viscosity depending on the end use without impeding coating properties of the composition.

The precursor composition of the invention is a stable varnish. The composition is applied onto substrates by ordinary coating procedures and is able to provide a film of a polyimidesilicone resin on the substrate surface by treatment at relatively low temperatures within a short time. For instance, where a polyamic acid is used as the ingredient (B), the applied composition is heated to a temperature of 100° to 200° C. to evaporate off the solvent therefrom, followed by further heating at 200° to 400° C., preferably 250° C. to 400° C., for a time not longer than 6 hours, preferably 30 minutes to 5 hours, thereby forming a polyimide resin by dehydration and ring closure reactions of the polyamic acid and subsequently undergoing condensation between the carboxylic acid groups in the polysiloxane (A) and the amino groups of the polyimide. As a result, a film of a polyimidesilicone resin is formed. Where the polyimide resin derived from the polyamic acid is used, a one-stage thermal treatment under conditions of a temperature of 100° to 300° C. and a time of 0.5 to 2 hours results in immediate formation of a polyimidesilicone resin.

The polyimidesilicone resin exhibits high adhesion to substrates, such as of silicon, owing to the siloxane modification, and also has good resistance to solvent and heat. Moreover, the resin exhibits good physical properties such as a dielectric constant, mechanical strength, insulation breakdown strength and volume resistivity. Thus, the resin is suitable for use as a protective film on electronic parts. The protective films for electronic parts include, for example, a wide variety of films such as a junction coat film, a passivation film and a buffer coat film on the surfaces of semiconductor devices such as diodes, transistors, IC, LSI and the like, α-ray shielding films such as for LSI, layer insulative films such as of multi-layered electrodes, conformal coatings such as of printed circuit boards, alignment films such as of liquid crystal devices, ion implantation masks, and the like.

The present invention is described in more detail by way of examples.

REFERENCE 1

15.1 g of 4-(dichloromethylsilyl)-phthalic anhydride were dissolved in dichloromethane, followed by addition of water in an amount of five times by mole that of the anhydride. After neutralization and washing with water, the resultant hydrolyzate was treated with acetic anhydride, followed by reprecipitation with a tetrahydrofuran-hexane mixture to obtain 8.9 g of polysiloxyphthalic anhydride. The gel permeation chromatographic (GPC) analysis revealed that the degree of polymerization was 4.9 on average. NMR and IR spectra revealed that the product was one wherein phthalic anhydride was joined to the polysiloxane.

4.1 g of the polysiloxyphthalic anhydride was dissolved in 15 ml of tetrahydrofuran, followed by addition of 1.8 g of water and 0.05 g of triethylamine and heating at 80° C. for 1 hour to convert the acid anhydride into a dicarboxylic acid. The solvent was distilled off under reduced pressure to obtain 3.8 g of polysiloxane-dicarboxylic acid. The dicarboxylic acid has a degree of polymerization of 4.8 (corresponding to m=4 in the formula (1)) on average.

REFERENCE 2

1.3 g of the polysiloxyphthalic anhydride obtained in Reference 1 was dissolved in 9 ml of methanol, followed by heating at 70° C. for 1 hour to convert the acid anhydride into a dicarboxylic acid monoester. The GPC analysis revealed that the degree of polymerization, m, was 4.9 on average.

EXAMPLE 1

120 g of N-methyl-2-pyrrolidone was added to 13.52 g (0.067 mols) of 4,4'-diaminodiphenyl ether in an atmosphere of nitrogen, to which a mixture of 5.03 g (0.0 15 mols) of benzophenonetetracarboxylic dianhydride and 9.54 g (0.044 mols) of pyromellitic dianhydride was gradually added, followed by agitation for 12 hours to obtain a polyamic acid solution.

A solution of 1.5 g of the polysiloxane-dicarboxylic acid prepared in Reference 1 in 12 ml of tetrahydrofuran was added to the thus obtained polyamic acid solution, followed by agitations until a uniform solution was obtained. Thus, a polyimidesilicone resin precursor composition was obtained.

This composition was applied onto a glass substrate for the measurements of heat resistance and tensile strength or onto a silicon wafer for a cross-cut test and thermally treated by two stages of 150° C.×1 hour and then 350° C.×1 hour, thereby forming a polyimidesilicone resin film on the substrate. The film was subjected to the measurements of heat resistance (thermal decomposition temperature), adhesion (cross cut test) and tensile strength (JIS K-6301). The results are shown in Table 1.

EXAMPLE 2

120 g of N-methyl-2-pyrrolidone was added to 12.51 g (0.062 mols) of 4,4'-diaminodiphenyl ether in an atmosphere of nitrogen, followed by gradual addition of a mixture of 5.03 g (0.015 mols) of benzophenonetetracarboxylic dianhydride and 9.54 g (0.044 mols) of pyromellitic dianhydride and agitation for 12 hours to obtain a polyamic acid solution.

A solution, in 9 ml of methanol, of 1.2 g of the polysiloxane-dicarboxylic acid monoester prepared in Reference 2 was added to the polyamic acid solution and agitated until a uniform solution was obtained, thereby obtaining a polyimidesilicone resin precursor composition.

This composition was applied onto a substrate and thermally treated by two stages of 150° C.×1 hour and then 350° C.×1 hour, thereby forming a polyimidesilicone resin film on the substrate. The film was subjected to measurements of heat resistance, adhesion and tensile strength in the same manner as in Example 1. The results are shown in Table 1.

COMPARATIVE EXAMPLE 1

120 g of N-methyl-2-pyrrolidone was added to 12.14 g (0.060 mols) of 4,4'-diaminodiphenyl ether in an atmosphere of nitrogen, followed by gradual addition of a mixture of 5.80 g (0.018 mols) of benzophenonetetracarboxylic dianhydride and 9.16 g (0.042 mols) of pyromellitic dianhydride and agitation for 12 hours to obtain a polyamic acid solution.

This solution was applied onto a substrate and thermally treated by two stages of 150° C.×1 hour and then 350° C.×1 hour in the same manner as in Example 1, thereby forming a polyimide resin film on the substrate. The film was subjected to measurements of heat resistance, adhesion and tensile strength in the same manner as in Example 1. The results are shown in Table 1.

COMPARATIVE EXAMPLE 2

4.47 g (0.018 mols) of 1,3-bis(3-aminopropyl)-1,1,3,3-tetramethyldisiloxane and 120 g of N-methyl-2-pyrrolidone were added to 8.49 g (0.042 mols) of 4,4'-diaminophenyl ether in an atmosphere of nitrogen, to which a mixture of 5.80 g (0.018 mols) of benzophenonetetracarboxylic dianhydride and 9.16 g (0.042 mols) of pyromellitic dianhydride was gradually added and agitated for 12 hours to obtain a coating composition.

This composition was applied onto a substrate and thermally treated by two stages of 150° C.×1 hour and then 250° C.×1 hour in the same manner as in Example 1, thereby forming a polyimidesilicone resin film on the substrate. The film was subjected to measurements of heat resistance, adhesion and tensile strength in the same manner as in Example 1. The results are shown in Table 1.

TABLE 1

|  | Example 1 | Example 2 | Comparative Example 1 | Comparative Example 2 |
| --- | --- | --- | --- | --- |
| Heat resistance (°C.) | 480 | 480 | 480 | 460 |
| Adhesion (cross cut test) | 0/100 | 0/100 | 100/100 | 0/100 |
| Tensile strength (kg/cm$^2$) | 1500 | 1500 | 1400 | 1300 |

EXAMPLE 3

40 g of diethylene glycol dimethyl ether was added to 19.0 g (0.042 mols) of 2,2-(bis(3,4-benzenedicarboxylic anhydride)perfluoropropane in an atmosphere of nitrogen, followed by dropping a solution of 23.2 g (9.056 mols) of 2,2-bis[4-(4-aminophenoxy)phenyl]propane in 100 g of diethylene glycol dimethyl ether, followed by agitation for 12 hours. Thereafter, a reflex condenser having a water receptor was attached to the reactor, to which 40 g of xylene was added. The reaction system was heated at 150° C. for 4 hours to imidize the resultant polyamic acid. After cooling of the reaction solution, the solution was subjected to re-precipitation with methanol to obtain 39.4 g of a polyimide compound.

39.1 g of the polyimide was dissolved in 160 g of diethylene glycol dimethyl ether, to which a solution, in 15 ml of tetrahydrofuran, of 3.2 g of the polysiloxane-dicarboxylic acid prepared in Reference 1 was added and agitated to make a uniform solution, thereby obtaining a polyimidesilicone precursor composition.

The composition was applied onto a substrate and thermally treated by two stages of 150° C.×1 hour and then 250° C.×1 hour, thereby forming a polyimidesilicone resin film. The film was subjected to measurements of heat resistance and adhesion in the same manner as in Example 1 and also of solvent resistance. The results are shown in Table 2. The solvent resistance was determined by immersing the film in diethylene glycol dimethyl ether and judging whether or not the film was dissolved in.

EXAMPLE 4

40 g of diethylene glycol dimethyl ether was added to 19.0 g (0.042 mols) of 2,2-(bis(3,4-benzenedicarboxylic anhydride)perfluoropropane in an atmosphere of nitrogen, followed by dropping a solution of 23.2 g (0.056 mols) of 2,2-bis[4-(4-aminophenoxy)phenyl]propane in 100 g of diethylene glycol dimethyl ether, followed by agitation for 12 hours. Thereafter, a reflux condenser having a water receptor was attached to the reactor, to which 40 g of xylene was added. The reaction system was heated at 150° C. for 4 hours to imidize the resultant polyamic acid. After cooling of the reaction solution, the solution was subjected to re-precipitation with methanol to obtain 39.4 g of a polyimide compound.

39.1 g of the polyimide was dissolved in 160 g of diethylene glycol dimethyl ether, to which a solution, in 15 ml of methanol, of 3.4 g of the polysiloxane-dicarboxylic acid monoester prepared in Reference 2 was added and agitated to make a uniform solution, thereby obtaining a polyimidesilicone precursor composition.

The composition was applied onto a substrate and thermally treated by two stages of 150° C.×1 hour and then 250° C.×1 hour, thereby forming a polyimidesilicone resin film. The film was subjected to measurements of heat resistance, adhesion and solvent resistance in the same manner as in Example 3. The results are shown in Table 2.

COMPARATIVE EXAMPLE 3

50 g of diethylene glycol dimethyl ether was added to 25.3 g (0.056 mols) of 2,2-(bis(3,4-benzenedicarboxylic anhydride)perfluoropropane in an atmosphere of nitrogen, followed by dropping a solution of 23.2 g (0.056 mols) of 2,2-bis[4-(4-aminophenoxy)phenyl]propane in 100 g of diethylene glycol dimethyl ether, followed by agitation for 12 hours, thereby obtaining a polyamic acid solution.

Thereafter, a reflux condenser having a water receptor was attached to the reactor, to which 50 g of xylene was added. The reaction system was heated at 150° C. for 4 hours to imidize the polyamic acid. After cooling of the reaction solution, the solution was subjected to re-precipitation with methanol to obtain 47.3 g of a polyimide compound.

40 g of the polyimide compound was dissolved in 160 g of diethylene glycol dimethyl ether and applied onto a substrate, followed by thermal treatment of 150° C.×1 hour and then 250° C.×1 hour, thereby forming a polyimide cured film. The film was subjected to measurements of heat resistance, adhesion and solvent resistance in the same manner as in Example 3. The results are shown in Table 2.

COMPARATIVE EXAMPLE 4

50 g of diethylene glycol dimethyl ether was added to 25.3 g (0.056 mols) of 2,2-(bis(3,4-benzenedicarboxylic anhydride)perfluoropropane in an atmosphere of nitrogen, followed by dropping a solution of 16.2 g (0.039 mols) of 2,2-bis[4-(4-aminophenoxy)phenyl]propane and 4.17 g (0.017 mols) of 1,3-bis(3-aminopropyl)-1,1,3,3-tetramethyldisiloxane in 100 g of diethylene glycol dimethyl ether, followed by agitation for 12 hours.

Thereafter, a reflux condenser having a water receptor was attached to the reactor, to which 50 g of xylene was added. The reaction system was heated at 150° C. for 4 hours to imidize the resultant polyamic acid. After cooling of the reaction solution, the solution was subjected to re-precipitation with methanol to obtain 44.5 g of a polyimide compound.

40 g of the polyimide compound was dissolved in 160 g of diethylene glycol dimethyl ether and applied onto a substrate, followed by thermal treatment of 150° C.×1 hour and then 250° C.×1 hour, thereby forming a polyimidesilicone film. The film was subjected to measurements of heat resistance, adhesion and solvent resistance in the same manner as in Example 3. The results are shown in Table 2.

TABLE 2

| | Example 3 | Example 4 | Comparative Example 3 | Comparative Example 4 |
|---|---|---|---|---|
| Heat resistance (°C.) | 440 | 440 | 430 | 420 |
| Adhesion (cross cut test) | 0/100 | 0/100 | 100/100 | 0/100 |
| Solvent resistance | good | good | dissolved | dissolved |

As will be apparent from the foregoing examples, the precursor compositions of the invention are cured at relatively low temperatures within short times to provide films which have good heat and solvent resistances and adhesion to substrates. Thus, the films of the invention will be useful as an insulating and/or protecting film for electronic parts.

What is claimed is:

1. A precursor composition capable of yielding a polyimidesilicone resin which comprises:

(A) a polysiloxane comprising units of the following general formula (1)

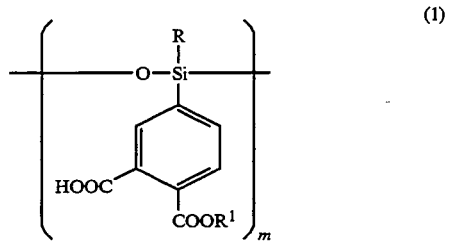

(1)

wherein R represents a monovalent organic group having up to 10 carbon atoms, $R^1$ represents a hydrogen atom or a monovalent organic group having up to 10 carbon atoms, and m is an integer not smaller than 3; and (B) a polyamic acid of the following general formula (2), or a polyimide resin derived from the polyamic acid

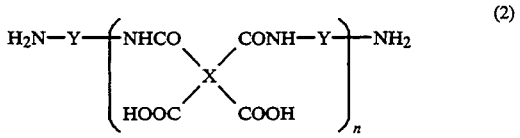

(2)

wherein X represents a tetravalent organic group and Y represents a divalent organic group, n is an integer or 1 or over, a ratio by weight between the polyamic acid or polyimide resin derived from the polyamic acid and the polysiloxane being in the range of 1:1 to 100:1.

2. A precursor composition according to claim 1, wherein R in the formula (1) is a methyl or an ethyl group.

3. A precursor composition according to claim 1, wherein $R^1$ is a methyl, an ethyl or a propyl group.

4. A precursor composition according to claim 1, wherein said polysiloxane has the units of the formula (1) in an amount of not less than 5 wt % based on the polysiloxane.

5. A precursor composition according to claim 4, wherein said polysiloxane consists essentially of the units of the formula (1).

6. A precursor composition according to claim 1, wherein the ingredient (B) consists of said polyamic acid.

7. A precursor composition according to claim 1, wherein the ingredient (B) consists of said polyimide resin.

8. A precursor composition according to claim 1, wherein the ingredients (A) and (B) are so mixed that the ratio between the amine equivalent of the terminal amino groups of the ingredient (B) and the carboxy equivalent of the ingredient (A) is in the range of 1:1.8 to 1:2.2.

9. A precursor composition according to claim 1, wherein m in the formula (1) is an integer of from 3 to 12.

10. A polyimidesilicone resin obtained by curing the composition of claim 1.

* * * * *